(12) United States Patent
Kim et al.

(10) Patent No.: US 8,300,051 B2
(45) Date of Patent: Oct. 30, 2012

(54) APPARATUS AND METHOD FOR ENHANCING IMAGES IN CONSIDERATION OF REGION CHARACTERISTICS

(75) Inventors: Seong Dae Kim, Daejon (KR); Keun Dong Lee, Seoul (KR); Su Jung Kim, Daegu (KR); Hwang Soo Lee, Gyeonggi-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 997 days.

(21) Appl. No.: 12/274,495

(22) Filed: Nov. 20, 2008

(65) Prior Publication Data

US 2010/0085361 A1  Apr. 8, 2010

(30) Foreign Application Priority Data

Oct. 8, 2008  (KR) .................. 10-2008-0098723

(51) Int. Cl.
- *G06T 17/00* (2006.01)
- *G09G 5/02* (2006.01)
- *G09G 5/10* (2006.01)

(52) U.S. Cl. .................. 345/428; 345/589; 345/690
(58) Field of Classification Search .................. 345/428, 345/589, 690
See application file for complete search history.

(56) References Cited

U.S. PATENT DOCUMENTS

| | | | | |
|---|---|---|---|---|
| 5,754,709 A | * | 5/1998 | Moriya et al. | 382/274 |
| 5,867,286 A | * | 2/1999 | Lee et al. | 358/523 |
| 6,271,891 B1 | * | 8/2001 | Ogawa et al. | 348/674 |
| 2001/0004400 A1 | * | 6/2001 | Aoki et al. | 382/107 |
| 2002/0122019 A1 | * | 9/2002 | Baba et al. | 345/88 |
| 2005/0025357 A1 | * | 2/2005 | Landwehr et al. | 382/170 |
| 2005/0162352 A1 | * | 7/2005 | Lee | 345/63 |
| 2005/0168645 A1 | * | 8/2005 | Yamazaki | 348/655 |
| 2005/0276502 A1 | * | 12/2005 | Brown Elliott et al. | 382/254 |
| 2006/0007067 A1 | * | 1/2006 | Baek | 345/63 |
| 2006/0164524 A1 | * | 7/2006 | Shibano et al. | 348/234 |
| 2007/0182687 A1 | * | 8/2007 | Kim et al. | 345/98 |
| 2008/0007565 A1 | * | 1/2008 | Nogawa et al. | 345/597 |
| 2009/0027413 A1 | * | 1/2009 | Pyo | 345/589 |
| 2009/0060330 A1 | * | 3/2009 | Liu | 382/173 |

* cited by examiner

*Primary Examiner* — David T Welch
(74) *Attorney, Agent, or Firm* — Adam K. Sacharoff

(57) ABSTRACT

Disclosed herein is an apparatus for enhancing images in consideration of region characteristics. An inverse gamma correction unit releases gamma correction and linearizes each of Red (R), Green (G), and Blue (B) colors. A threshold calculation unit calculates m-1 thresholds in order to divide the brightness of pixels into m regions, and labels each of the pixels as one of the m brightness regions. A block segmentation unit divides an input image into M×N blocks. A block statistics calculation unit determines one of the m brightness regions to which each of the blocks pertains, and labels the block as the corresponding brightness region. A block-based Look-Up Table (LUT) generation unit generates enhancement LUTs for the respective blocks. An image enhancement unit corrects the image using the LUTs for the respective blocks. A gamma correction unit performs gamma correction.

15 Claims, 10 Drawing Sheets

APPARATUS AND METHOD FOR ENHANCING IMAGES IN CONSIDERATION OF REGION CHARACTERISTICS

BACKGROUND OF THE INVENTION

1. Field of the Invention

The present invention relates generally to an apparatus and method for enhancing images, and, more particularly, to an apparatus and method for enhancing images, having the limited dynamic range of a brightness level, such as images taken in a backlight compensation mode, to high dynamic range images.

2. Description of the Related Art

As is well known in the art, dynamic range means difference in brightness between the darkest and brightest discriminative regions of interest in an image. For example, in the case of a black and white image of 8 bits, if brightness is not saturated in both a dark region and a bright region, the dynamic range of this image becomes 256:1. Human eyes can detect a scene with a dynamic range of 10000:1 or more. However, if this scene is taken by a digital camera, all regions cannot be regularly expressed, so that some regions are saturated and the information thereof is lost during a process of quantizing the scene into discrete brightness levels (chiefly, 8 bits for the single color channel of a pixel)

For example, if an image is taken in a backlight compensation mode, a subject is darkened due to underexposure, so that there is a disadvantage in that the region of interest of the subject cannot be detected. If exposure is increased in order to alleviate such a disadvantage, the region of interest of the subject can be detected but the brightness of a region, such as a background, which has not been affected by backlight, is saturated due to overexposure, so that the region of interest of the background cannot be detected.

In order to solve the problems, a plurality of methods has been proposed. There is a hardware method of using an image sensor for obtaining images taken at multiple exposure times with a single image-taking. With regard to other accessing methods of taking images using existing cameras and processing the images as signals, there are methods such as gamma correction and histogram equalization.

In the case of gamma correction, the brightness distribution of a dark region is enlarged, so that the region of interest of the dark region can be detected. However, since a single Look-Up Table (LUT) is used, the brightness distribution of a bright region should be excessively compressed, so that there are problems in that information is lost in the bright region and the saturation of colors is lowered. Similarly, in the case of histogram equalization, since a single LUT is used, there are disadvantages in that the overall contrast is not natural and color image distortion is bad. In addition, although there is a plurality of methods using a single LUT, the excessive compression is inevitably performed on other regions in order to enlarge a dark region, with the result that local contrast cannot be considered, so that there are common disadvantages in that only a intensity of pixels of input image controls the enhanced intensity of pixels and information based on the location of the pixel is not considered.

In order to overcome the above-described limits, methods of using a plurality of LUTs have been proposed. The simple example thereof is an adaptive histogram equalization method of equalizing a histogram for each block. This method has an advantage of considering local contrast. However, since the number of brightness levels within a block is small, there is a disadvantage in that a Halo effect is generated and noise is amplified during a process of equalizing a histogram. In addition, there is a method of applying different LUTs depending on locations. However, in the case in which a subject, the original color of which is dark because reflectance from an object is low, exists in a bright region, the subject cannot be distinguished from a subject which is darkened due to backlight, so that there is a problem of distorting the brightness and color information of a normal object. The reason for this is that, when pixels are enhanced using the above-described methods, even though the pixels have different enhancement characteristics depending on the locations thereof by referring to information about adjacent pixels, the information about adjacent pixels to be referred to is limited due to the amount of operation. It is difficult to accurately distinguish a subject which is darkened due to backlight from a subject which is originally dark due to the unique reflectance of an object. However, in order to obtain enhanced images having better image qualities, it is required to use different enhancement methods even in the same dark region depending on the cause, that is, low reflectance and backlight.

SUMMARY OF THE INVENTION

Accordingly, the present invention has been made keeping in mind the above problems occurring in the prior art, and an object of the present invention is to provide an apparatus and method for enhancing images, which corrects an image, having limited dynamic range, to a high dynamic range image by dividing a brightness region into m regions and differently processing the m regions while differentiating a dark region into a region which is darkened due to an external light source element, such as backlight, from a region whose original brightness and color are dark because the unique reflectance thereof is low, and applying different enhancement methods depending on the differentiated regions.

In greater detail, the object of the present invention is to perform minimized enhancement on a bright region, to perform low strength enhancement on a middle brightness region, to perform high strength enhancement on a dark region which is dark due to external light source elements, and to perform low strength enhancement on a region whose original brightness and color are dark.

In order to accomplish the above object, the present invention provides an apparatus for enhancing images in consideration of region characteristics, including an inverse gamma correction unit for releasing gamma correction and linearizing each of Red (R), Green (G), and Blue (B) colors; a threshold calculation unit for calculating m-1 thresholds in order to divide the brightness of pixels into m regions, and labeling each of the pixels as one of the m brightness regions; a block segmentation unit for dividing an input image into M×N blocks; a block statistics calculation unit for determining one of the m brightness regions to which each of the blocks pertains, and labeling the block as the corresponding brightness region; a block-based Look-Up Table (LUT) generation unit for generating enhancement LUTs for the respective blocks; an image enhancement unit for enhancing the image using the LUTs for the respective blocks, which are generated through the block-based LUT generation unit; and a gamma correction unit for performing gamma correction.

Meanwhile, the present invention provides a method of enhancing images in consideration of region characteristics, including the steps of (a) an inverse gamma correction unit releasing gamma correction applied for display of an image, and linearizing each of R, G, and B colors; (b) a threshold calculation unit calculating m-1 thresholds in order to divide the brightness of pixels into m regions, and labeling each of the pixels as one of the m brightness regions; (c) a block segmentation unit dividing an input image into M×N blocks; (d) a block statistics calculation unit calculating block indexes capable of indicating the statistical characteristics of the blocks, determining one of the m brightness regions to which each of the blocks pertains, and labeling the block as the corresponding brightness region; (e) an block-based LUT generation unit generating primary LUTs for the respective blocks by combining LUTs for the respective blocks using overlapping of brightness regions and block indexes for m basis LUTs, and then generating final LUTs for the respective blocks by obtaining averages or weighted averages between the primary LUTs for the respective blocks and LUTs for adjacent blocks; (f) an image enhancement unit enhancing the values of the pixels of the blocks using the LUTs for the respective blocks generated through the step (e); and (g) a gamma correction unit applying again gamma correction that has been released through the inverse gamma correction unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
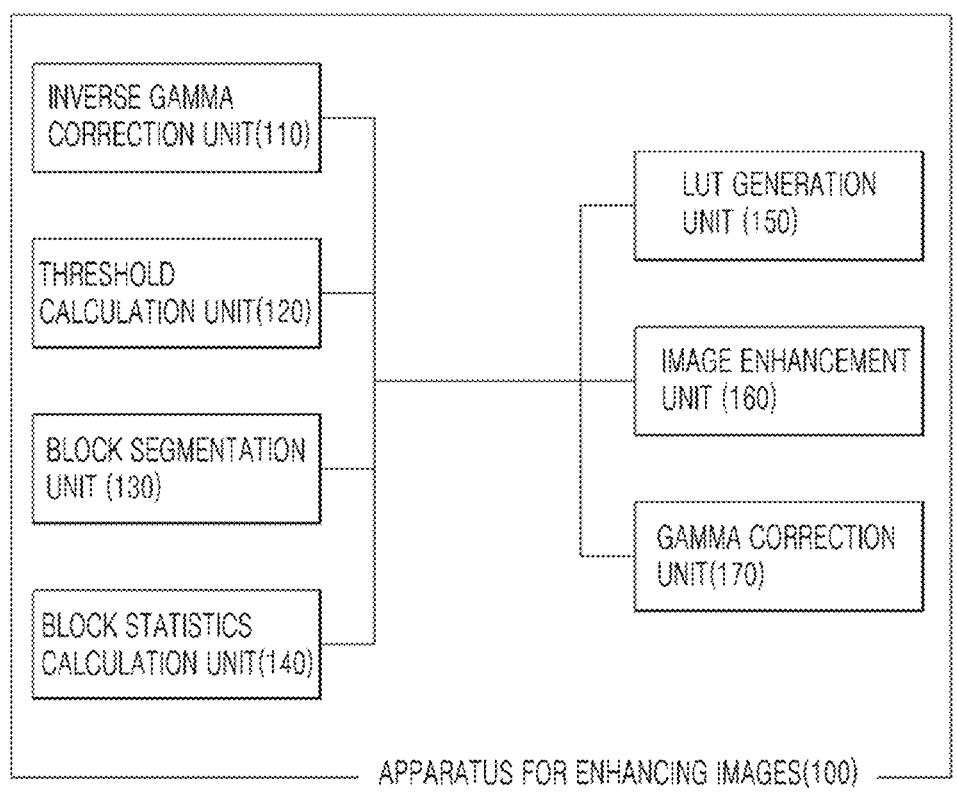
FIG. 1 is a diagram showing the overall configuration of an apparatus for enhancing images according to the present invention.

Reference now should be made to the drawings, in which the same reference numerals are used throughout the different drawings to designate the same or similar components.

Features and advantages of the present invention will be described in detail with reference to the attached drawings below. It should be noted that, in the following description, when it is determined that a detailed description of well-known functions related to the present invention and the construction thereof would make the gist of the present invention obscure, they will be omitted.

The present invention will be described in detail with reference to the attached drawings below.

An apparatus and method for enhancing images in consideration of region characteristics according to the present invention will be described with reference to FIGS. 1 to 10 below.

FIG. 1 is a block diagram showing the configuration of an apparatus 100 for enhancing images in consideration of region characteristics according to the present invention. As shown in FIG. 1, the apparatus 100 for enhancing images includes an inverse gamma correction unit 110, a threshold calculation unit 120, a block segmentation unit 130, a block statistics calculation unit 140, an LUT generation unit 150, an image enhancement unit 160, and a gamma correction unit 170, as shown in FIG. 1.

In particular, the inverse gamma correction unit 110 performs a function of releasing gamma correction applied to display an input image, and linearizing Red (R), Green (G), and Blue (B) colors.

Generally, since gamma correction that r=0.45 is performed due to the nonlinear display characteristics of a monitor, inverse gamma correction that r=1/0.45=2.2 is performed and linearized R, G, and B values are acquired. However, in the case in which the input image is expressed by $n_1$-bit (chiefly, $n_1$=8) for the single color channel of a pixel and inverse gamma correction that r=2.2 is performed on an image, having limited dynamic range, as in a backlight compensation mode, so that, like the input image, the image is expressed by $n_1$-bit (chiefly, $n_1$=8) for the single color channel of a pixel, the plurality of levels of dark brightness values decreases to a smaller number of levels. The reason for this is that gamma that r=2.2 compresses the dark brightness values. If pieces of brightness, which originally has different values, has an identical value after inverse gamma correction is performed, there is a problem in that information is lost.

In order to prevent the problem, after the inverse gamma correction is performed, information about the single color channel of a pixel should be expressed by $n_2$-bits ($n_1 < n_2$) which is greater than $n_1$ which is the bit number for the single color channel of the pixel of an original input image. In this case, a problem in that different input brightness levels become the same level after the inverse gamma correction is performed can be prevented.

Figure 2:
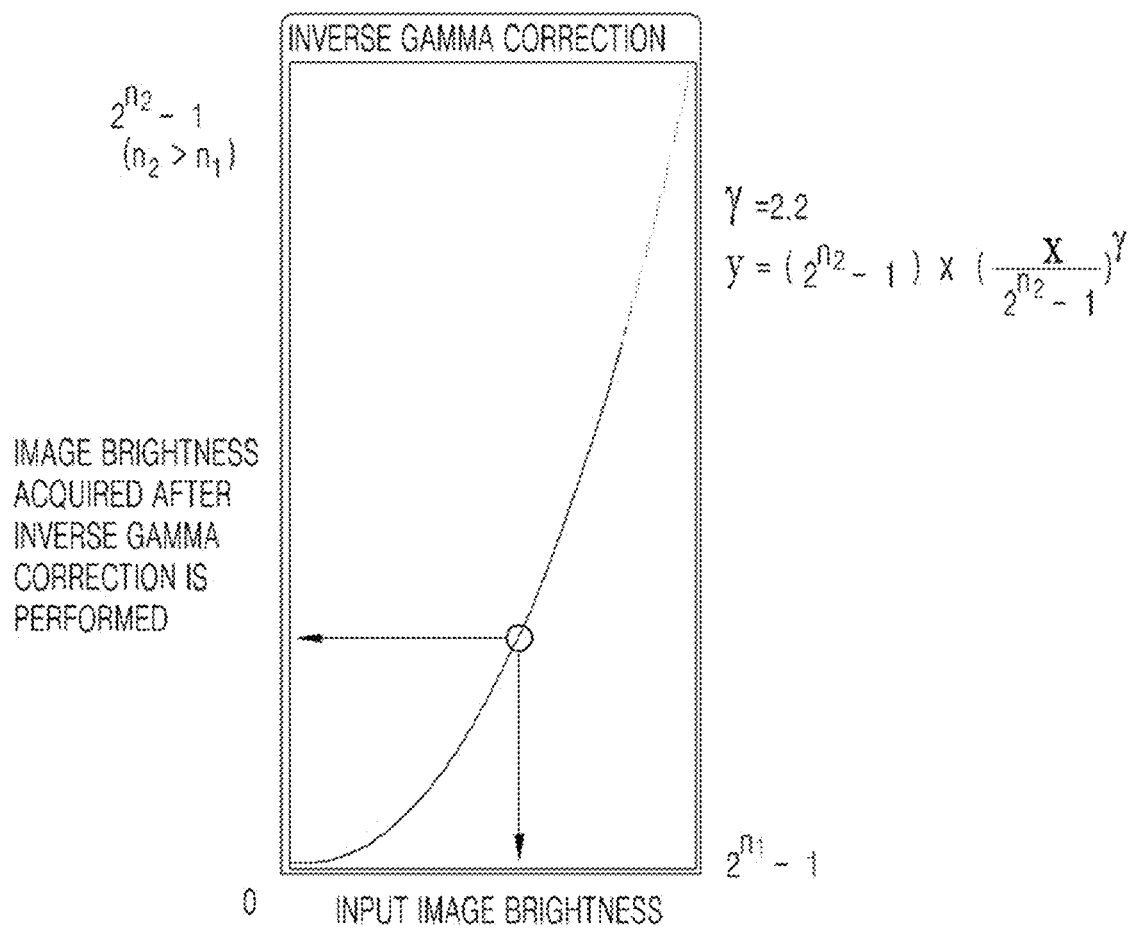
FIG. 2 is a view showing an example of inverse gamma correction according to the present invention.

The inverse gamma correction may be expressed as FIG. 2 and the following Equation 1. Here, x indicates the level of the color channel of an input image, and y indicates the level of a color channel acquired after the inverse gamma correction is performed.

$$y = (2^{n_2} - 1) \times \left(\frac{x}{2^{n_1} - 1}\right)^\gamma \quad (1)$$

The threshold calculation unit 120 calculates m-1 thresholds in order to divide the brightness of pixels into m regions. That is, in order to make enhancement strength differ from each other depending on the brightness regions of an image, m-1 brightness region thresholds are calculated so as to divide the brightness region into m regions.

In the present invention, the 'brightness region' is divided into a 'dark region', a 'middle-brightness region', and a 'bright region'. For this purpose, two brightness region thresholds $k_1$ and $k_2$ are acquired. Further, the thresholds are acquired by preparing a histogram for information about the brightness of pixels and applying Ostu's method which has been used for threshold-based segmentation. In the present embodiment, although setting is made such that the brightness region is divided into three regions, the present invention is not limited thereto and various settings can be made such that the brightness region is divided into four and five regions.

Ostu's method is used to divide an arbitrary data set into two groups. The principal of this method is to minimize dispersion $\sigma^2 W$ within an identical group but to maximize the dispersion $\sigma^2 B$ between different groups, that is, used to acquire the threshold k which minimizes $$\frac{\sigma^2 W}{\sigma^2 B}.$$

Meanwhile, an image, having limited dynamic range, has respective large valleys in a dark region and a bright region and has a flat middle brightness region in a brightness region histogram. It is effective that the brightness region is divided into three or more regions, so that enhancement is performed for the brightness regions which are further fractionized.

That is, the threshold calculation unit 120 prepares a histogram at the specific region of an input image, and divides the prepared histogram into three regions.

Figure 3:
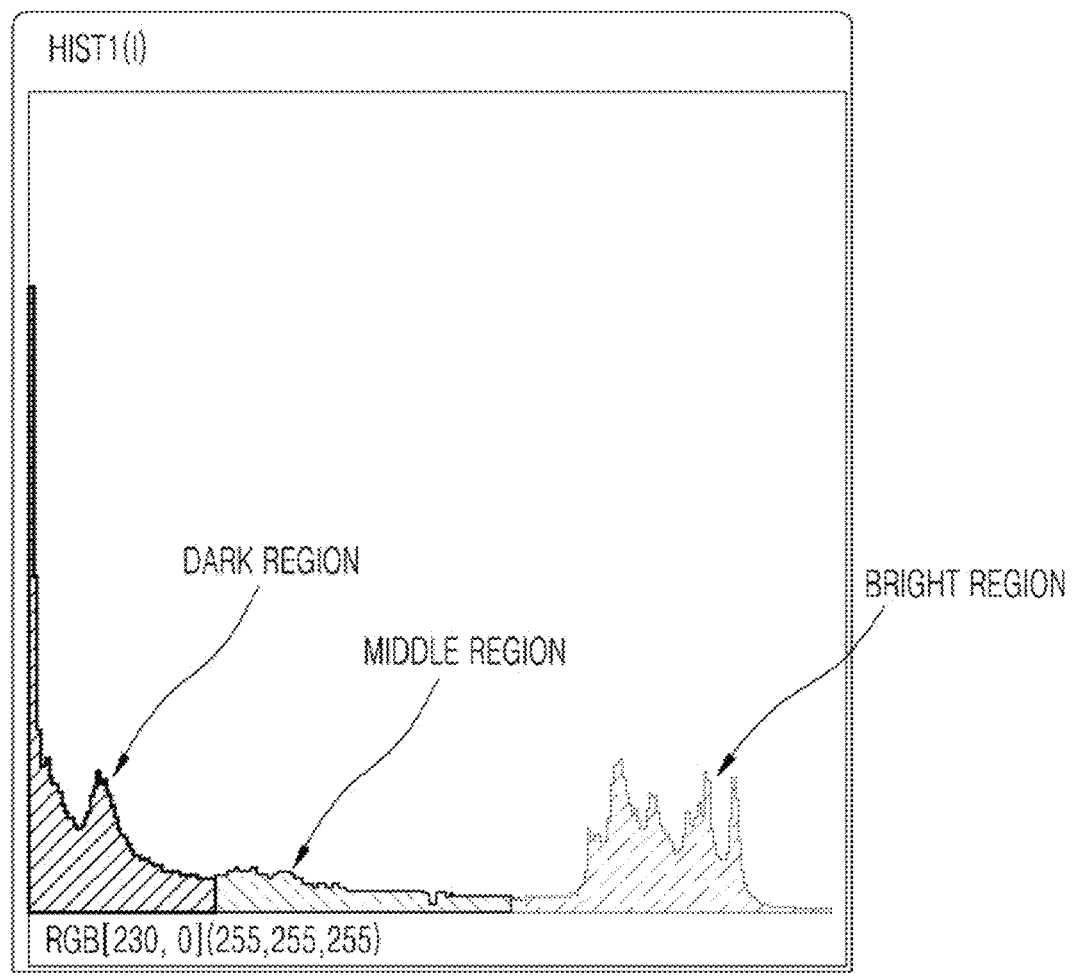
FIG. 3 is a view showing an example of the histogram and brightness region of an input image at an I region according to the present invention.

FIG. 3 shows a histogram at the I region $$\left(I = \frac{R + G + B}{3}\right),$$

the 'I' region being divided into three regions. The three regions include the valley of a dark region, a flat middle brightness region, and the valley of a bright region.

Here, in the case in which the histogram is divided into two regions, a threshold is 'k' and the single color channel of a pixel is $n_1$-bit, the thresholds $k_1$ and $k_2$ are obtained by overlapping regions based on the threshold as in $0 \sim c_1 (k < c_1 < (2^{n_1} - 1)/2)$ or $c_2 \sim 2^{n_1} - 1 (k/2 < c_2 < k)$ of the histogram, and applying Ostu's method again. The values $k_1$ and $k_2$ are thresholds used to respectively perform division into a dark region and a middle brightness region and perform division into a middle brightness region and a bright region.

All the pixels can be labeled as one of the three regions using these thresholds. In the case in which the histogram is divided into four or more regions, the above method can be used.

Figure 4:
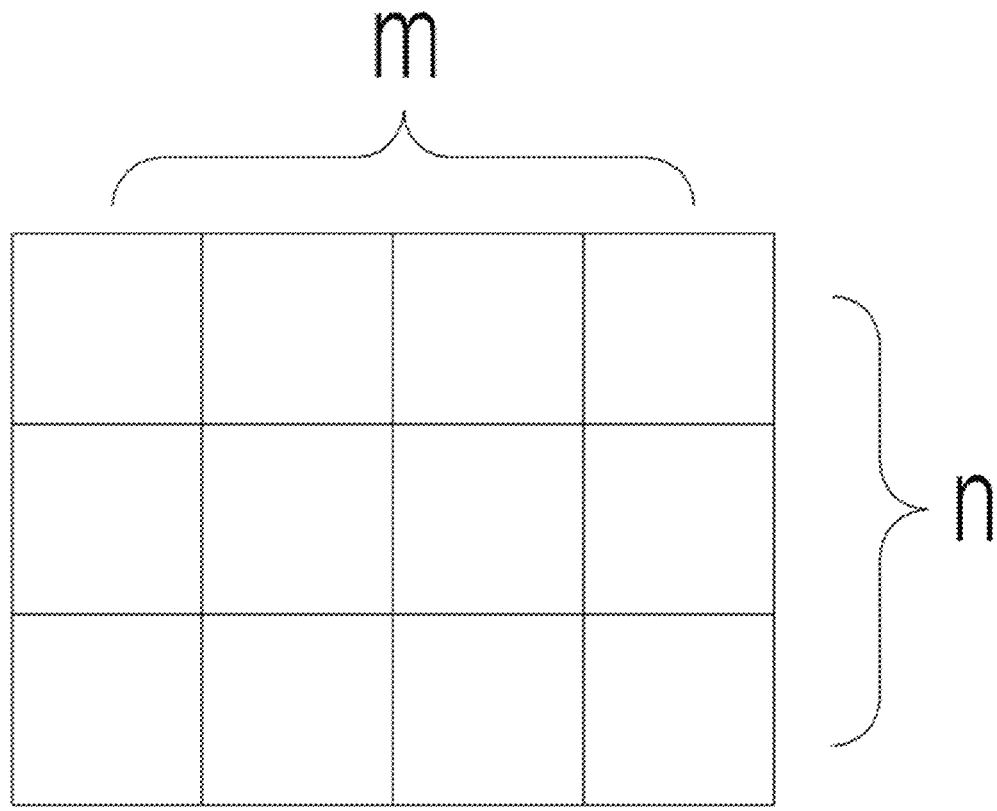
FIG. 4 is a view showing an example in which the input image is divided into M×N blocks according to the present invention.

Thereafter, the block segmentation unit 130 performs a function of dividing an input image into M×N blocks, M indicating the number of block in width and N indicating the number of block in height, as shown in FIG. 4. The number of blocks is fixed and the sizes of the blocks vary depending on the size of the input image.

Figure 5:
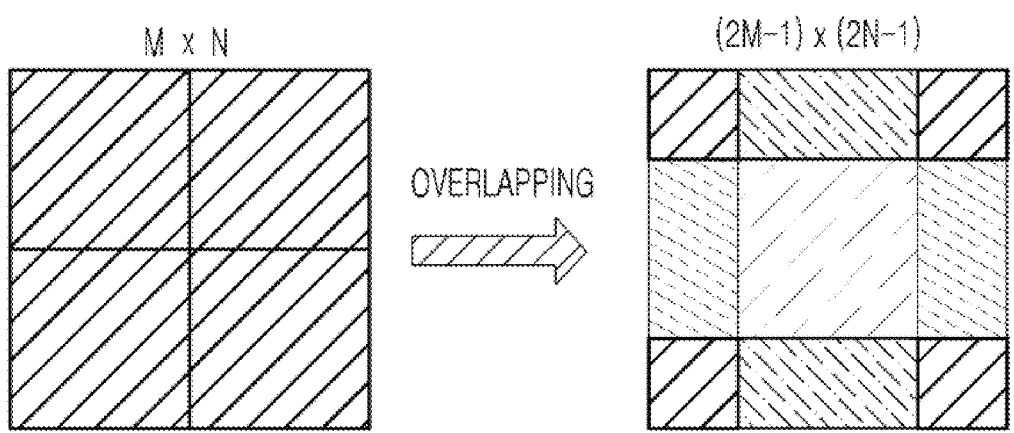
FIG. 5 is a view showing an example in which blocks overlap with each other when the input image is divided into blocks according to the present invention.

Here, when the input image is processed for respective blocks, in order to remove the differently processed portions of edges between the blocks, the M×N blocks of the input image may overlap with each other and become (2M-1)×(2N-1) blocks, as shown in FIG. 5.

Further, the block statistics calculation unit 140 calculates indexes capable of indicating the statistical characteristics of blocks (hereinafter referred to as 'block indexes'), determines one of m brightness regions to which each of the respective blocks pertains, and labels the blocks as the corresponding brightness regions.

Here, when the brightness region is divided into m regions, the indexes may include the index of a region having the largest distribution in each of the blocks, the center of gravity of the region in the block, the portions or ratios of each of m brightness regions in the block, and the brightness average and brightness dispersion of the block.

That is, each of the blocks can be divided into m blocks as in the case of the brightness region. In the present invention, the brightness region is divided into three regions (a dark region, a middle brightness region, and a bright region), a region in which each of pixels of the block is included is investigated, and the region having the largest ratio of the block is allocated to a representative region.

For example, if the number of pixels included in the dark region is greater than the number of pixels included in other regions in a single block, this block becomes a dark block. Therefore, blocks may be classified into a dark block, a middle brightness block, and a bright block in this manner.

Further, the block-based LUT generation unit 150 generates LUTs for the respective corresponding blocks.

If the brightness region is divided into m regions, m basis LUTs exist. That is, if the brightness region is divided into three regions, that is, a dark region, a middle brightness region, and a bright region, three basis LUTs exist. All types of existing methods can be applied to the basis LUTs, as well as basic methods such as a gamma Function, a Modified gamma Function, and Histogram Equalization.

Figure 6:
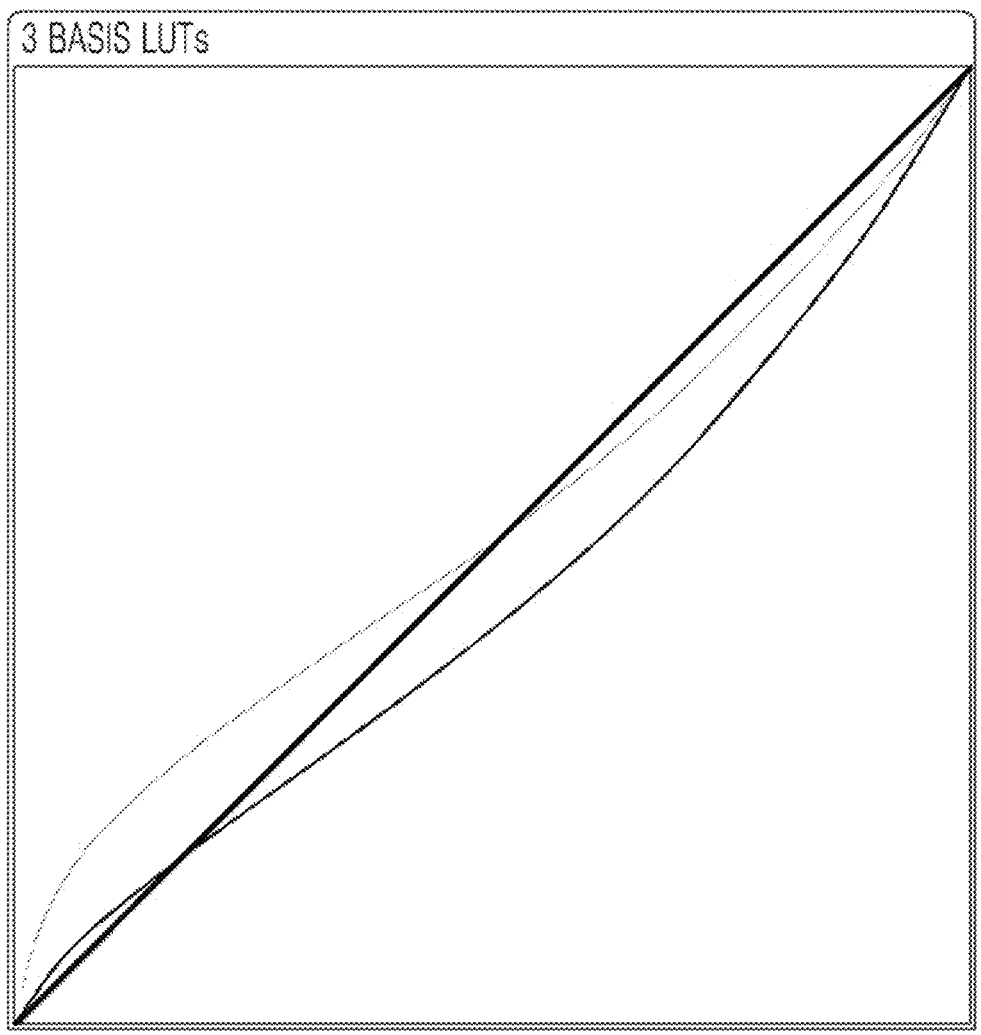
FIG. 6 is a view showing an example of basis LUTs using three modified gamma functions according to the present invention.

In the present invention, in the case in which the brightness region is divided into three regions, three basis LUTs based on the three regions, that is, a first table LUT_1 which has high enhancement strength so as to be applied to a dark region, a third table LUT_3 which is scarcely enhanced so as to be applied to a bright region, and a second table $LUT_{13}$ 2 which has enhancement strength existing between the first and third tables so as to be applied to a middle brightness region, are used. FIG. 6 shows the three basis LUTs according to the present invention.

Here, the m basis LUTs are not used as they are but m LUTs are appropriately combined, thereby generating LUTs which are different from each other for respective blocks. In the preferred embodiment of the present invention, three elements, that is, overlapping of brightness regions, block indexes and reference to LUTs of adjacent blocks, are applied for the combination of the LUTs.

Figure 7:
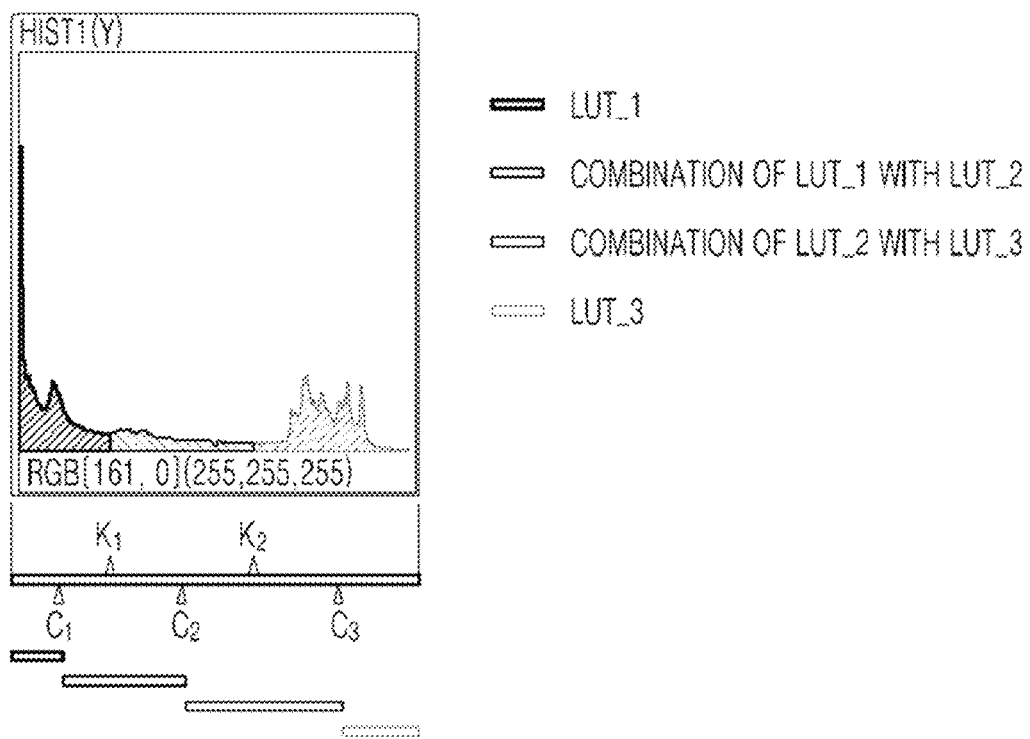
FIG. 7 is a view showing an example of composition of LUTs using overlapping of bright regions according to the present invention.

First, the reason that overlapping of brightness regions is used is as follows. When the brightness region threshold calculation unit 120 acquires thresholds $k_1$ and $k_2 (k_1 < k_2)$ which will be used to divide the brightness region into three regions, the first table LUT_1 is used in a region which has the brightness level of a pixel that is less than $k_1$, the second table LUT_2 is used in a region which has the brightness level of a pixel that is greater than $k_1$ but less than $k_2$, and the third table LUT_3 is used in a region which has the brightness level of a pixel that is greater than $k_2$. However, if different LUTs are used around a relevant threshold, artifacts will appear due to the heterogeneous enhancement around the threshold. Therefore, different LUTs are not used around the threshold. As shown in FIG. 7, LUT combination thresholds are set in the brightness regions of $c_1 (0 < c_1 < k_1)$, $c_2 (k_1 < c_2 < k_2)$, and $c_3 (k_2 < c_3 < 2^{n_1} - 1)$ on the basis of the thresholds $k_1$ and $k_2$. In the case in which the brightness level of a pixel is less than $c_1$, the first table LUT_1 is used. In the case in which the brightness level of a pixel exists between $c_1$ and $c_2$, the first table LUT_1 and the second table LUT_2 are appropriately combined together so that an enhancement LUT does not rapidly vary at the threshold $k_1$.

Further, in the case in which the brightness level of a pixel exists between $c_2$ and $c_3$, the second table LUT_2 and the third table LUT_3 are appropriately combined together so that an enhanced LUT does not rapidly vary at the threshold $k_2$. In the case in which the brightness level of a pixel is greater than $c_3$, only the third table LUT_3 is used.

In a method of combining LUTs through overlapping of brightness regions according to a preferred embodiment of the present invention, the relative distances to the respective thresholds $k_1$ and $k_2$ can be calculated using combination ratio.

Secondly, the reason that block indexes are used is for the object of the present invention, that is, the block indexes are used to perform enhancement by discriminating a region which becomes dark due to external elements, such as backlight, from a region whose brightness is dark due to the low reflectance of an object. It is assumed that a specific block is determined as a dark block by the statistics calculation unit 140 when an image is divided into blocks. If the reason that the block is determined as the dark block is that the ratio of inside pixels, included in the dark region, is high, different types of enhancement are required to be performed depending on whether the ratio is 50% or the ratio is 90%. If the ratio of dark pixels in the corresponding block is 90%, there is a high probability of a wide region becoming dark due to backlight. Meanwhile, if the weight of the dark pixels is the highest in the block but the ratio itself is small, for example, 50%, there is a probability that a dark object may be included in a bright region due to the low reflectance of the object. If the same enhancement strength is applied while the difference between the above two cases is not considered, image quality may be deteriorated in the latter case in which the enhancement should not be performed. Although it is difficult to accurately discriminate a region which becomes dark due to an external light source from a region whose brightness is originally dark, the chief concept of the present invention is to differentiate enhancement strength even for the same dark region using statistics in the block, and to restrict enhancement for a region which should not be enhanced even though the region is a dark region. The image is divided into blocks for this reason. According to the preferred embodiment of the present invention, a method of differentiating enhancement strength using block indexes (statistics in blocks) uses the ratio of pixels corresponding to a specific brightness region in a block while complying with the above-described method of combining LUTs together using overlapping of brightness regions.

For example, if the ratio of the dark region is high, the combination weight of a first look-up table LUT_1 which is used in a dark region is raised, and, if the ratio of dark pixels is relatively low even in the case of the same dark block, the combination weight of the first look-up table LUT_1 is lowered.

In the end, when the LUTs for respective blocks are combined, the LUTs of adjacent blocks can be referred to. If different LUTs are used for respective blocks, local contrast can be maintained well. However, artifacts may appear between the blocks due to heterogeneous enhancement for the LUTs of the adjacent blocks at the edges between blocks.

Figure 8:
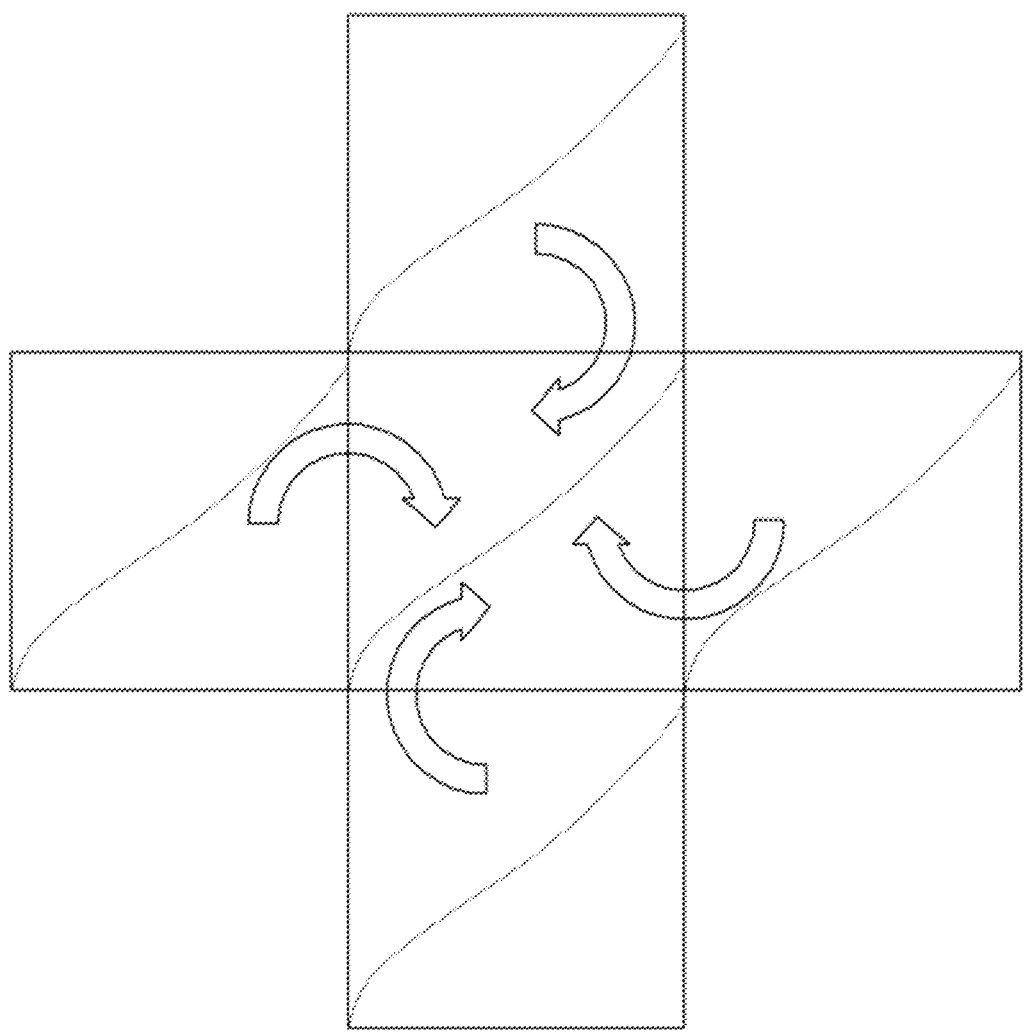
FIG. 8 is a view showing an example in which averages or weighted averages between LUTs of adjacent blocks are acquired when the LUTs for respective blocks are generated according to the present invention.

In order to alleviate this problem, with regard to m basis LUTs, primary LUTs for respective blocks are generated by combining the LUTs of the respective blocks using above-described overlapping of brightness regions and block indexes, and then final LUTs for the respective blocks are generated by acquiring the averages or weighted averages between the primary LUTs for the respective blocks and the LUTs of adjacent blocks. This is shown in FIG. 8. A distance from the center of gravity of a relevant block to the center of gravity of a neighboring block may be used to acquire the weight when acquiring the weighted average.

Further, the image enhancement unit 160 corrects an image using LUTs.

That is, the values of pixels are enhanced using the LUTs for respective blocks generated by the block-based LUT generation unit 150.

The enhancement result value $Y_e$ or $I_e$ using LUTs is obtained by applying Y=0.299*R+0.587*G+0.114*B or I=(R+G+B)/3 of each of inverse gamma corrected pixels to each of the LUTs.

Thereafter, enhancement result values $R_e$, $G_e$, and $B_e$ are obtained by enhancing the color values of respective R, G, and B based on the following Equation 2. If the R, G, and B are separately applied to the respective LUTs and then enhanced, original color ratio is broken. Therefore, the color ratio between linearized R, G, and B is maintained using the following Equation 2.

Here, the reason that the gain is set to $$\frac{I_e + 1}{I + 1}$$

instead of $$\frac{I_e}{I}$$

is to prevent the case in which the gain cannot be expressed in numerical value when I is 0.

$$\text{gain} = \frac{I_e + 1}{I + 1} \quad (2)$$

$$R_e = \text{gain} \times R$$

$$G_e = \text{gain} \times G$$

$$B_e = \text{gain} \times B$$

When the LUT of a single block is generated, the average or weighted average between the LUT and an adjacent LUT is acquired in consideration of the adjacent LUT. However, if an enhancement value is obtained using the LUT of the single block in which a pixel is included when the pixel is enhanced, artifacts which are not natural may appear at the edge between the blocks. Therefore, not only the LUT of the block in which the pixel is included but also the LUT of an adjacent block is applied to I or Y of the pixel, the average or weighted average between the LUT of the block and the LUT of the adjacent block can be acquired as the final enhancement result of the pixel using the respective enhancement result values enhanced based on Equation 2. The weight can be acquired using a distance from a pixel to be enhanced to the center of gravity of the brightness region of a neighboring block when the weighted average is acquired. According to another preferred embodiment of the present invention, blocks overlap with each other as shown in FIG. 5, so that artifacts can be removed at the edges between the blocks.

Further, since inverse gamma correction has been performed for enhancement and gamma for display was released, the gamma correction unit 170 applies the gamma for display again.

Through the above-described series of processes, a finally enhanced image can be acquired. If the input image is not RGB domain but another domain, such as YCbCr, HSI, or L*a*b*, the color coordinates thereof are converted into RGB coordinates, and enhancement is performed like in the above-described method, and then the RGB coordinates are converted back into the corresponding coordinates.

A method of enhancing images using the above-described apparatus 100 for enhancing images will now be described with reference to FIG. 9.

Figure 9:
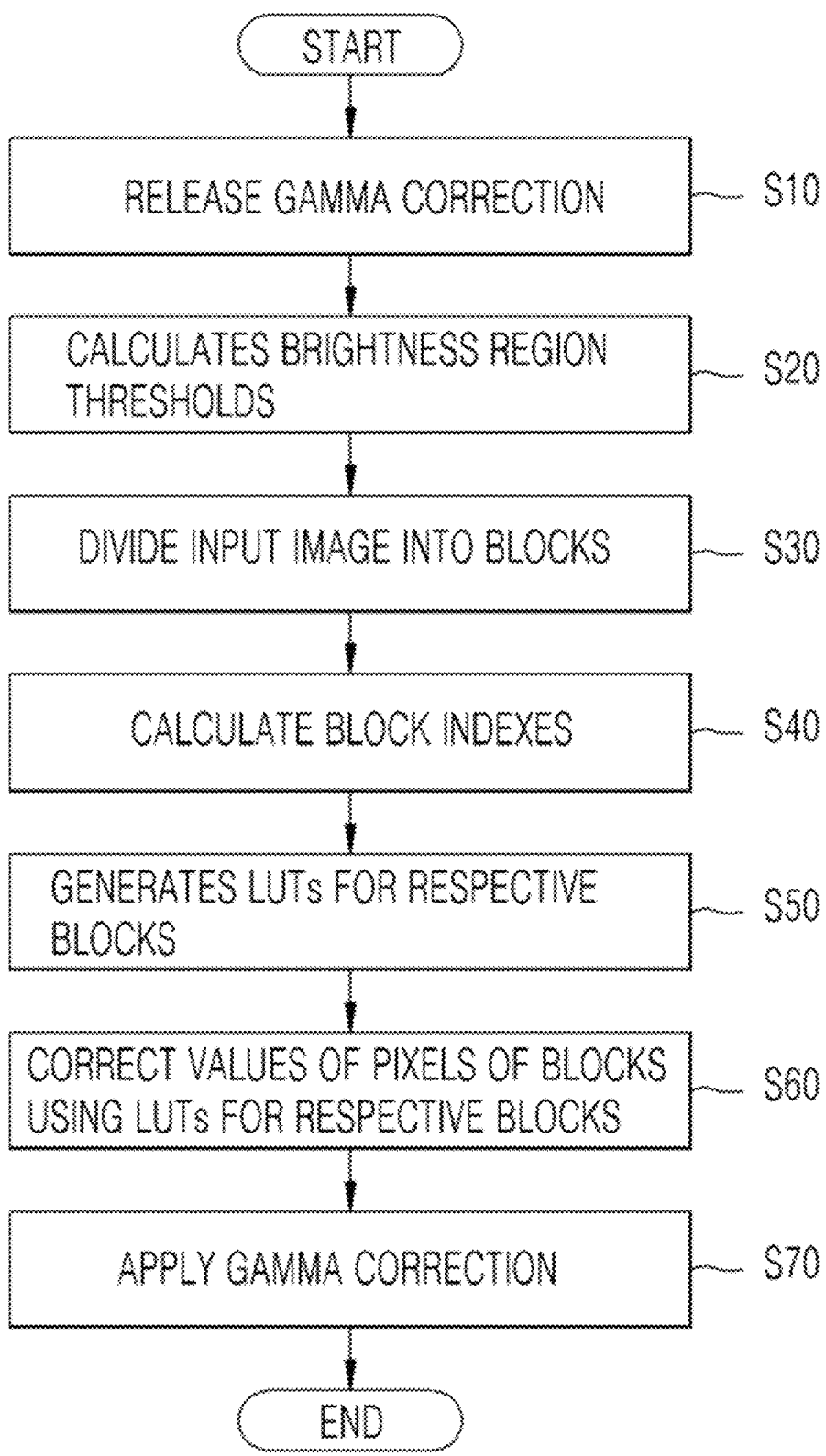
FIG. 9 is a flowchart showing a method of enhancing images in consideration of region characteristics according to an embodiment of the present invention.

FIG. 9 is a flowchart showing the method of enhancing images in consideration of region characteristics according to the present invention. As shown in FIG. 9, the inverse gamma correction unit 110 releases gamma correction applied for the display of an image, and linearizes each of R, G, and B colors at step S10, and the threshold calculation unit 120 calculates m-1 thresholds in order to divide the brightness of pixels into m regions at step S20.

Thereafter, the block segmentation unit 130 divides the input image into M×N blocks at step S30, and the block statistics calculation unit 140 calculates indexes (hereinafter referred to as 'block indexes') capable of expressing the statistical characteristics of the blocks, determines each of m brightness regions to which each of the blocks pertains, and then labels the block as the corresponding brightness region at step S40.

Thereafter, with regard to m basis LUTs, the block-based LUT generation unit 150 generates primary LUTs for respective blocks by combining LUTs of the respective blocks using overlapping of brightness regions and the block indexes, and generates a final LUTs for respective blocks by acquiring the averages or weighted averages between the primary LUTs for respective blocks and the LUTs of adjacent blocks at step S50.

The image enhancement unit 160 corrects the values of the pixels in the block using the LUTs for respective blocks generated by the block-based LUT generation unit 150 at step S60.

Thereafter, the gamma correction unit 170 applies again gamma correction, released by the inverse gamma correction unit 110, and then outputs the image at step S70.

Figure 10:
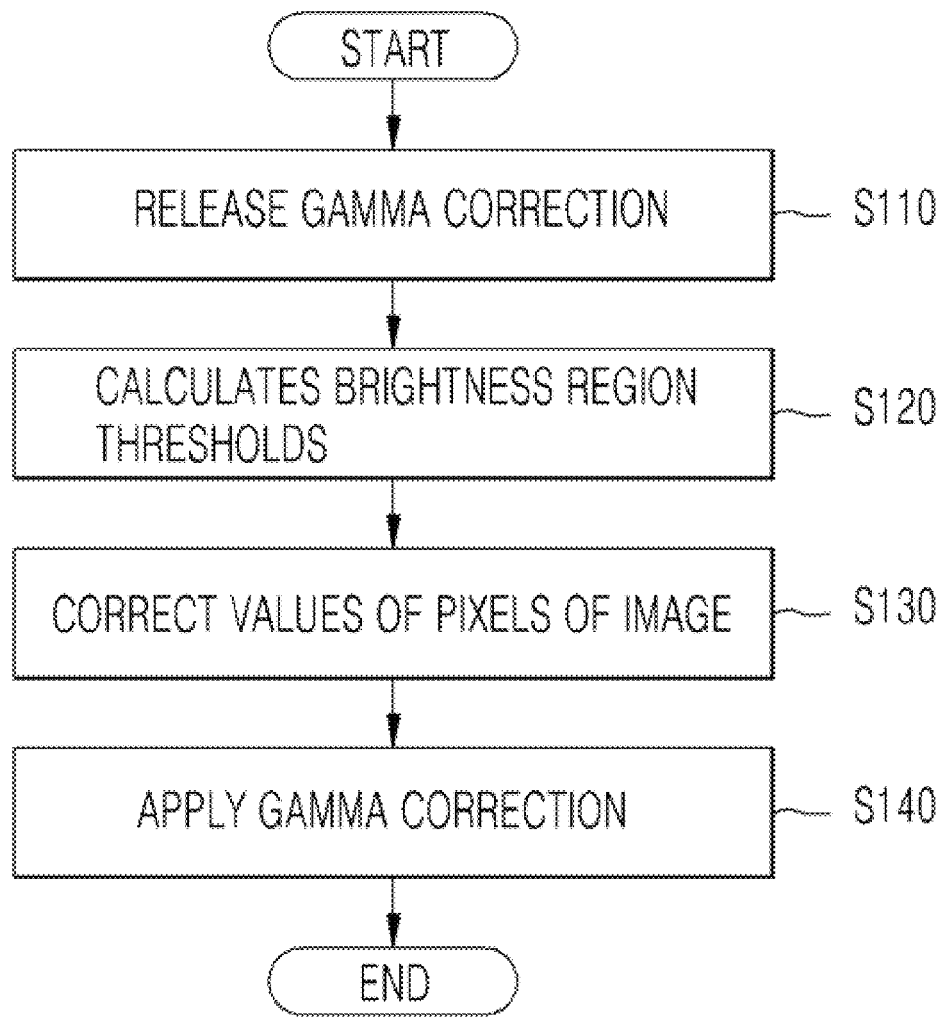
FIG. 10 is a flowchart showing a method of enhancing images in consideration of region characteristics according to another embodiment of the present invention.

Meanwhile, in the case in which a user does not need to discriminate a region whose brightness is originally dark due to low reflectance, from a region which is dark due to the effect of an external light source, and enhancement speed is considered first, the above-described method of FIG. 9 can be simplified as in FIG. 10.

As shown in FIG. 10, the inverse gamma correction unit 110 releases gamma correction, applied for the display of an image, and linearizes each of R, G, and B colors at step S110, and the threshold calculation unit 120 calculates m-1 thresholds in order to divide the brightness of pixels into m regions, so that each of the pixels is labeled as one of m brightness regions at step S120.

Thereafter, the image enhancement unit 160 corrects the values of pixels included in the image at step S130, and the gamma correction unit 170 applies again the gamma correction, released by the inverse gamma correction unit 110, at step S140.

The above-described enhancement method is the same as the method shown in FIG. 9, the only difference being that steps S30 to S50 of segmenting blocks, calculating the statistics of the blocks, and generating LUTs for respective blocks are excluded from the method of FIG. 9. That is, the division of an image into blocks is omitted, so that information about the locations of the pixels is not used when enhancement is performed but only information about the brightness of the pixels is used, thereby reducing time required for the enhancement.

According to the present invention, a plurality of LUTs is utilized in divided brightness regions and characteristics for the regions are considered, so that there is an advantage in that the detail of a subject can be enhanced to be a discriminative image in all the regions of an image while brightness is not saturated in both dark and bright regions.

Further, according to the present invention, enhancement can be performed while discriminating a region which is dark due to underexposure as in a backlight compensation mode, from a region which is dark due to the low reflectance of an object, so that there are advantages in that image quality can be improved compared to other methods, and in that a natural enhanced image can be acquired without artifacts using a method of combining LUTs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for enhancing images in consideration of region characteristics, comprising:
    an inverse gamma correction unit for releasing gamma correction and linearizing each of Red (R), Green (G), and Blue (B) colors;
    a threshold calculation unit for calculating m-1 thresholds in order to divide brightness of pixels into m regions, and labeling each of the pixels as one of the m brightness regions;
    a block segmentation unit for dividing an input image into M×N blocks;
    a block statistics calculation unit for determining one of the m brightness regions to which each of the blocks pertains, and labeling the blocks as a corresponding brightness region;
    a block-based Look-Up Table (LUT) generation unit for generating enhancement LUTs for the respective blocks;
    an image enhancement unit for enhancing the image using the LUTs for the respective blocks, which are generated through the block-based LUT generation unit; and
    a gamma correction unit for performing gamma correction and wherein the block-based LUT generation unit generates LUTs for the respective blocks by combining m LUTs, primary LUTs for the respective blocks being generated by combining the LUTs of the respective blocks using overlapping of brightness regions and block indexes for m basis LUTs, and final LUTs for the respective blocks being generated using averages or weighted averages between the primary LUTs for respective blocks and LUTs for adjacent blocks.

2. The apparatus as set forth in claim 1, wherein the inverse gamma correction unit performs inverse gamma correction using a number of bits greater than a number of bits of the input image, in order to prevent values having different levels before the gamma correction from being changed into values having an identical value after the gamma correction.

3. The apparatus as set forth in claim 1, wherein the threshold calculation unit calculates the brightness region thresholds, performs division into a plurality of brightness regions, and varies enhancement strength depending on a corresponding region.

4. The apparatus as set forth in claim 1, wherein the block segmentation unit overlaps the respective blocks in order to remove differently processed portions of edges between the blocks.

5. The apparatus as set forth in claim 1, wherein the block statistics calculation unit calculates block indexes including an index of a region having a largest distribution in each of the blocks, a center of gravity of a block, ratios of each of m brightness regions in the block, and a brightness average and brightness dispersion of the block.

6. The apparatus as set forth in claim 1, wherein the block-based LUT generation unit generates a number of basis LUTs equal to the number of brightness regions.

7. The apparatus as set forth in claim 1, wherein the image enhancement unit corrects values of the pixels in each of the blocks using the LUTs for respective blocks generated through the block-based LUT generation unit, an average or weighted average of enhancement result values based not only on the LUT for a relevant block in which the pixel is included but also on LUTs for adjacent blocks being obtained as a final enhancement result value.

8. A method of enhancing images in consideration of region characteristics, comprising the steps of:
   (a) an inverse gamma correction unit releasing gamma correction applied for display of an image, and linearizing each of R, G, and B colors;
   (b) a threshold calculation unit calculating m-1 thresholds in order to divide brightness of pixels into m regions, and labeling each of the pixels as one of the m brightness regions;
   (c) a block segmentation unit dividing an input image into M×N blocks;
   (d) a block statistics calculation unit calculating block indexes capable of indicating statistical characteristics of the blocks, determining one of the m brightness regions to which each of the blocks pertains, and labeling the blocks as a corresponding brightness region;
   (e) a block-based Look-Up Table (LUT) generation unit generating primary LUTs for the respective blocks by combining LUTs for the respective blocks using overlapping of brightness regions and block indexes for m basis LUTs, and then generating final LUTs for the respective blocks by obtaining averages or weighted averages between the primary LUTs for the respective blocks and LUTs for adjacent blocks;
   (f) an image enhancement unit enhancing values of the pixels of the blocks using the LUTs for the respective blocks generated through the step (e); and
   (g) a gamma correction unit applying again gamma correction that has been released through the inverse gamma correction unit.

9. The method as set forth in claim 8, wherein the step (a) comprises the inverse gamma correction unit performing inverse gamma correction using a number of bits greater than a number of bits of the input image.

10. The method as set forth in claim 8, wherein the step (b) comprises the threshold calculation unit calculating the brightness region thresholds, performing division into a plurality of brightness regions, and varying enhancement strength depending on a corresponding region.

11. The method as set forth in claim 8, wherein the step (c) comprises the block segmentation unit overlapping the respective blocks in order to remove differently processed portions of edges between the blocks.

12. The method as set forth in claim 8, wherein the step (d) comprises the block statistics calculation unit calculating block indexes including an index of a region having a largest distribution in each of the blocks, a center of gravity of a block, ratios of each of m brightness regions in the block, and a brightness average and brightness dispersion of the block.

13. The method as set forth in claim 8, wherein the step (e) comprises the block-based LUT generation unit generating a number of basis LUTs equal to the number of brightness regions.

14. The method as set forth in claim 8, wherein the step (e) comprises the block-based LUT generation unit generating LUTs for the respective blocks by combining m LUTs, primary LUTs for the respective blocks being generated by combining the LUTs of the respective blocks using overlapping of brightness regions and block indexes for m basis LUTs, and final LUTs for the respective blocks being generated using averages or weighted averages between the primary LUTs for respective blocks and LUTs for adjacent blocks.

15. The method as set forth in claim 8, wherein the step (f) comprises the image enhancement unit enhancing values of the pixels in each of the blocks using the LUTs for respective blocks generated through the block-based LUT generation unit, an average or weighted average of enhancement result values based not only on the LUT for a relevant block in which the pixel is included but also on LUTs for adjacent blocks being obtained as a final enhancement result value.

* * * * *